United States Patent
Yao et al.

(10) Patent No.: US 10,750,099 B2
(45) Date of Patent: Aug. 18, 2020

(54) IMAGE SENSING METHOD AND IMAGE SENSING SYSTEM

(71) Applicant: PRIMESENSOR TECHNOLOGY INC., Hsinchu County (TW)

(72) Inventors: Wen-Han Yao, Hsinchu County (TW); Chih-Huan Wu, Hsinchu County (TW)

(73) Assignee: PRIMESENSOR TECHNOLOGY INC., Hsinchu County (TW)

( * ) Notice: Subject to any disclaimer, the term of this patent is extended or adjusted under 35 U.S.C. 154(b) by 66 days.

(21) Appl. No.: 16/163,525

(22) Filed: Oct. 17, 2018

(65) Prior Publication Data

US 2020/0128190 A1    Apr. 23, 2020

(51) Int. Cl.
*H04N 5/243*    (2006.01)
*H04N 5/235*    (2006.01)

(52) U.S. Cl.
CPC ........... *H04N 5/243* (2013.01); *H04N 5/2351* (2013.01)

(58) Field of Classification Search
CPC .............................. H04N 5/243; H04N 5/2351
See application file for complete search history.

(56) References Cited

U.S. PATENT DOCUMENTS

| | | | | |
|---|---|---|---|---|
| 10,021,313 | B1* | 7/2018 | Chen ................... | H04N 5/23232 |
| 2007/0077055 | A1* | 4/2007 | Tominaga .............. | H04N 5/243 |
| | | | | 396/256 |
| 2008/0002036 | A1* | 1/2008 | Ohwa .................... | H04N 5/232 |
| | | | | 348/222.1 |
| 2009/0160976 | A1* | 6/2009 | Chen .................... | H04N 5/2351 |
| | | | | 348/234 |
| 2009/0231464 | A1* | 9/2009 | Nakamura ............. | H04N 5/217 |
| | | | | 348/229.1 |
| 2010/0171844 | A1* | 7/2010 | Okamoto ............... | H04N 5/232 |
| | | | | 348/229.1 |
| 2011/0298954 | A1* | 12/2011 | Nakaseko ............. | H04N 5/343 |
| | | | | 348/296 |
| 2012/0162462 | A1* | 6/2012 | Takeuchi ........... | H04N 5/23212 |
| | | | | 348/222.1 |
| 2013/0057716 | A1* | 3/2013 | Asakura ............. | H04N 5/23245 |
| | | | | 348/216.1 |
| 2014/0300787 | A1* | 10/2014 | Nakaseko ............. | H04N 5/343 |
| | | | | 348/296 |
| 2015/0085077 | A1* | 3/2015 | Kim ..................... | H04N 5/2353 |
| | | | | 348/46 |
| 2016/0366398 | A1* | 12/2016 | Chen .................... | H04N 5/2258 |
| 2017/0104909 | A1* | 4/2017 | Nakajima ............ | H04N 5/2351 |
| 2019/0281206 | A1* | 9/2019 | Lee ...................... | H04N 7/0127 |

* cited by examiner

*Primary Examiner* — Abdelaaziz Tissire
(74) *Attorney, Agent, or Firm* — Winston Hsu

(57) ABSTRACT

An image sensing method, comprising: (a) controlling an image sensor to apply a first frame rate to sense a first frame during a first frame period; (b) determining exposure variation in the first frame period; and (c) during one of the first frame period and a second frame period following the first frame period, switching the image sensor to apply a second frame rate different from the first frame rate to sense at least one third frame, when the step (b) determines the exposure variation exceeds a threshold level. A related image sensing system is also disclosed. Via such image sensing method, the frame switch delay of a conventional frame switch can be reduced.

20 Claims, 8 Drawing Sheets

IMAGE SENSING METHOD AND IMAGE SENSING SYSTEM

BACKGROUND OF THE INVENTION

1. Field of the Invention

The present invention relates to an image sensing method and an image sensing system, and particularly relates to an image sensing method an image sensing system which can save time for switching a frame rate of an image sensor.

2. Description of the Prior Art

A conventional image sensor always needs to switch between different frame rates. For example, the image sensor applies a low frame rate to sense frames in a standby mode, and applies a high frame rate to sense frames in an active mode.

FIG. 1 is a schematic diagram illustrating a conventional frame rate switch. Each frame time allows the image sensor to capture one frame, and the image sensor will not capture more than one frame in a single frame time. The length of time of each frame time could be variant depends on the frame rate of the image sensor.

As illustrated in FIG. 1, the image sensor initially applies a low frame rate (i.e. low FPS, low frame per second) to sense a first frame and a second frame respectively in the same frame time FT_a, that is, the first/second frame period consume the same length of time (i.e. the first frame time FT_a).

In one example, an exposure variation occurs at a time point TP_C during the first frame period and the exposure variation is determined at a time point TP_D later than the time point TP_C and during the second frame period. The exposure variation can mean the brightness variation. For example, if an object such as a living creator approaches an image sensor, the brightness sensed by the image sensor changes such that exposure variation occurs.

Therefore, the frame rate switch will be triggered at a time point TP_St, which is during the second frame period. Such delay from TP_D to TP_St may be caused by frame data read out, or frame data processing such as amplifying, or any other reasons. As a result that the frame rate of the image sensor is finally switched to a high frame rate (i.e. high FPS, high frame per second) at the time point TP_Sr after the second frame period is lapsed. Then the image sensor is able to capture the following frames in the second frame time FT_b. That is, the frame rate switch is delayed for almost a whole second frame period after the exposure variation happened.

Such delay causes some disadvantages. For example, the image sensor is applied to a monitor, and the image sensor applies a low frame rate while the monitor is in a standby mode. Also, the monitor is activated and the image sensor switches to a high frame rate when a exposure variation occurs, since exposure variation may mean some persons shows up in the scene captured by the image sensor or some events need to be noticed occur.

However, due to above-mentioned delay of the frame rate switch, the image sensor slowly switches to the high frame rate, such that some critical frames may not be clearly sensed in time.

SUMMARY OF THE INVENTION

Therefore, one objective of the present invention is to provide an image sensing method which can reduce the frame rate switch delay.

Another objective of the present invention is to provide an image sensing system which can reduce the frame rate switch delay.

One embodiment of the present invention discloses an image sensing method, comprising: (a) controlling an image sensor to apply a first frame rate to sense a first frame during a first frame period; (b) determining exposure variation in the first frame period; and (c) during one of the first frame period and a second frame period following the first frame period, switching the image sensor to apply a second frame rate different from the first frame rate to sense at least one third frame, when the step (b) determines the exposure variation exceeds a threshold level.

Another embodiment of the present invention discloses an image sensing system comprising an image sensor and a control circuit. The control circuit is configured to perform steps of: (a) controlling the image sensor to apply a first frame rate to sense a first frame during a first frame period; (b) determining exposure variation in the first frame period; and (c) during one of the first frame period and a second frame period following the first frame period, switching the image sensor to apply a second frame rate different from the first frame rate to sense at least one third frame, when the step (b) determines the exposure variation exceeds a threshold level.

In view of above-mentioned embodiments, the frame rate switch delay can be reduced. Also, the frame data amount of each frame sensed at a high frame rate can also be reduced.

These and other objectives of the present invention will no doubt become obvious to those of ordinary skill in the art after reading the following detailed description of the preferred embodiment that is illustrated in the various figures and drawings.

DETAILED DESCRIPTION

In following descriptions, different embodiments are provided to explain the concept of the present invention. Please note, each component in following embodiments can be implemented by hardware (e.g. a circuit, a device and a system) or hardware with software (e.g. processor installed with at least one program). Besides, the component can be separated to more components, or integrated to fewer components. Additionally, the term "first", "second" in following descriptions are only for define the same kind but different components, and do not mean any sequence or arrangement.

Further, following embodiments are applied to an example for switching an image sensor from a low frame rate to a high frame rate. However, the following embodiments can be applied to switch the image sensor from a high frame rate to a low frame rate as well.

Figure 1:
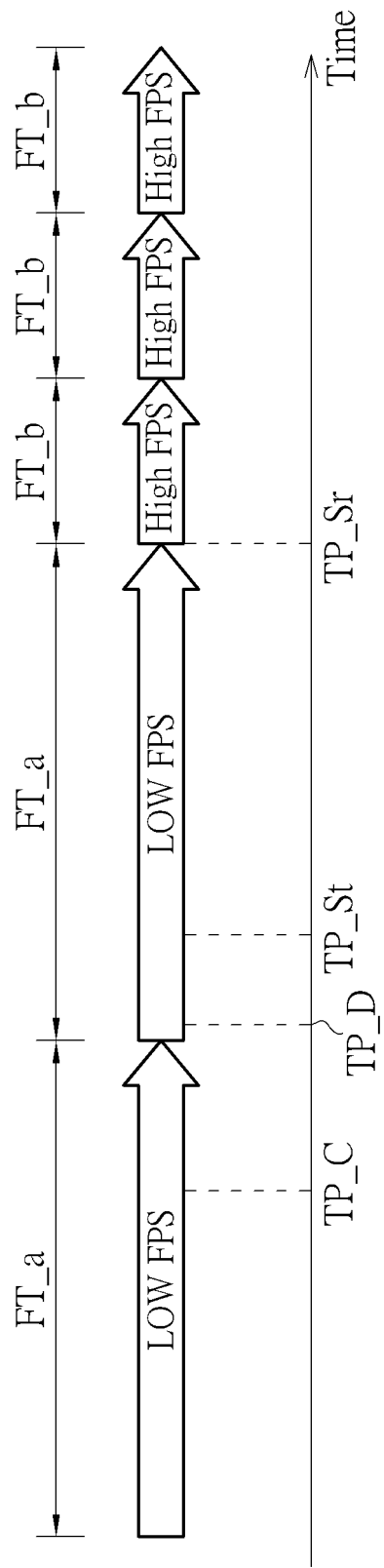
FIG. 1 is a schematic diagram illustrating a conventional frame rate switch.
Figure 2:
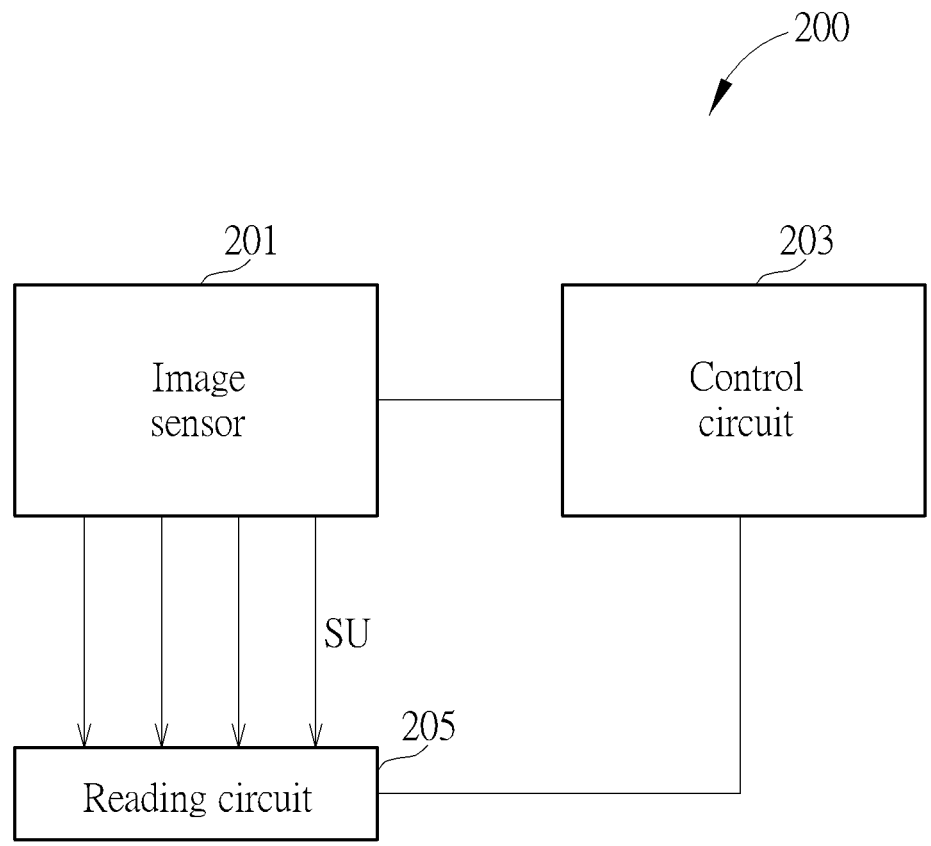
FIG. 2 is a block diagram illustrating an image sensing system according to one embodiment of the present invention.

FIG. 2 is a block diagram illustrating an image sensing system according to one embodiment of the present invention, and the image sensing system could be implemented as an IC, a module or a device. As illustrated in FIG. 2, the image sensing system 200 comprises an image sensor 201, a control circuit 203 and a reading circuit 205. The image sensor 201 is configured to sense frames, the reading circuit 205 is configured to read the sensed frames from the image sensor 201 and the control circuit 203 is configured to control the image sensor 201 to be operated in specific condition such as a specific frame rate or execute an exposure operation of the image sensor 201 and to control the reading circuit 205 to readout the sensed frames with specific gain value and to control cell (s) of the image sensor 201 to be readout. Operations of the image sensing system 200 will be described for more details later.

In following descriptions, two terms "frame time" and "frame period" are used. The term "frame time" means the time that sensing and reading of a frame occupies, and the frame period means a time period in which a frame is supposed to be sensed. The frame time can be smaller or equals to the frame period. In some embodiments, if the frame time is smaller than the frame period, the image sensor does not sense a next frame until the frame period ends.

Figure 3:
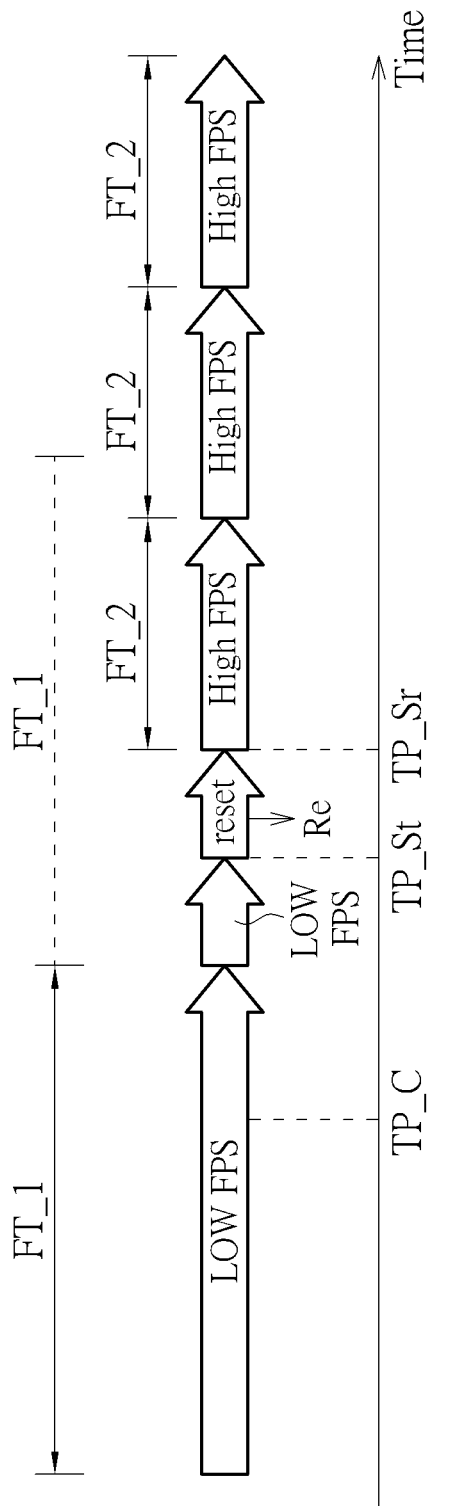
FIG. 3 and FIG. 4 are schematic diagrams illustrating image sensing methods according to different embodiments of the present invention.
Figure 4:
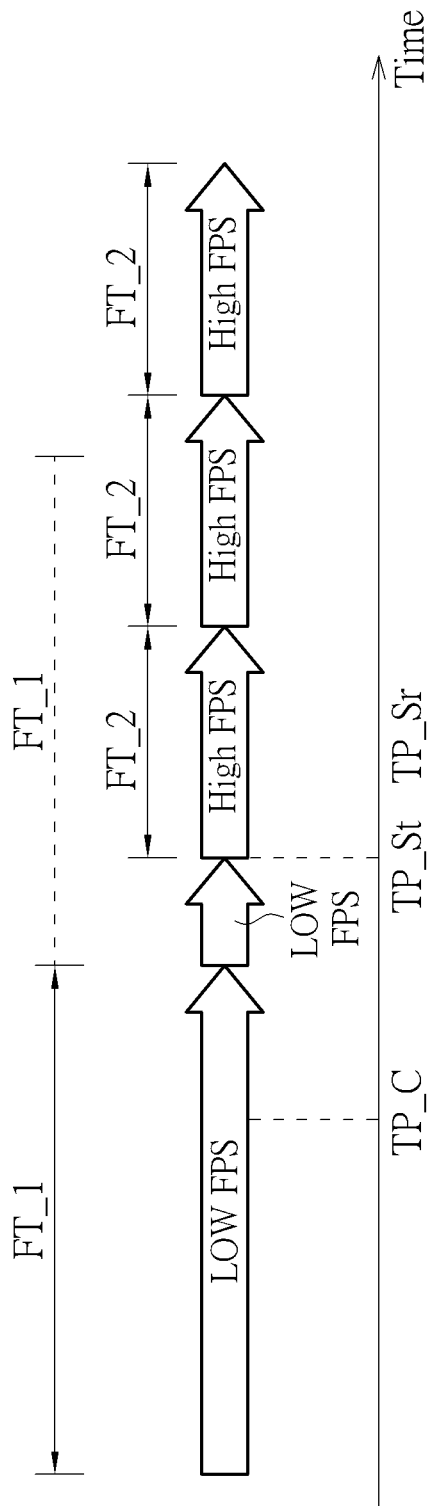

In the embodiments of FIG. 3 and FIG. 4, a frame time is equal to a frame time period. FIG. 3 is a schematic diagram illustrating an image sensing method according to one embodiment of the present invention. The image sensor 201 applies a first frame rate (in this embodiment, a low frame rate and the frame time is FT_1) to sense a first frame during a first frame period (the frame period marked by solid lines). In the embodiment of FIG. 3, the exposure variation occurs at the time point TP_C during the first frame period.

The image sensor 201 is supposed to use the first frame time FT_1 to sense a second frame during the second frame period (the frame time FT_1 marked by dotted lines), if no exposure variation occurs during the first frame period and the second frame period. However, if the exposure variation is identified (for example the exposure variation value is over a threshold level), the control circuit 203 controls the image sensor 201 to stop sensing the second frame and to switch from a low frame rate to a high frame rate and uses a second frame time FT_2 to capture the next frame.

For more detail, if exposure variation happens and the value is larger than a threshold level at the time point TP_C and the control circuit 203 knows such exposure variation occurs at the time point TP_St during the second frame period, the frame rate switch will be triggered at the time point TP_St. Immediately after a reset operation Re, the image sensor 201 is switched to a high frame rate at the time point TP_Sr without waiting the lapsed of the second frame period. Therefore, the control circuit 203 stops the image sensor 201 to capture the second frame so as to switch the image sensor 201 to capture a third frame in the high frame rate.

Please note, the frame rate can also be switched before the end of the first frame period as long as the time point TP_St is located within the first frame period. In this embodiment, the first frame will not be successfully captured and the image sensor 201 will use the high frame rate to capture the second frame and so the second frame period will consume the second frame time FT_2 which is less than the first frame time FT_1. Related embodiments will be described for more details later.

The exposure variation could be identified in different ways. For example, if the summation or average of at least some of the readout brightness value from the reading circuit 205 exceeds a specific value (in such case the specific value is the threshold level) then the exposure variation is identified, or if at least a specific number of the readout brightness value from the reading circuit 205 exceeds a specific value (in such case the specific number and the specific value are combined as the threshold level) then the exposure variation is identified.

Additionally, the above-mentioned reset operation Re means reset parameters for the image sensor 201 or reset parameters for components related with the image sensor 201. For example, a timing generator for the image senor 201 recounts from 0, wherein the timing generator may help the image sensor 201 to determine the length of each frame period. Also, stopping the exposure operation of a next frame if the exposure operation already starts, and the sensing charges generated by the reading circuit for the next frame is cleaned. Besides, analog circuits and digital circuits related with the image sensor 201 are switched to settings of the high frame rate and operate accordingly and immediately. After that, a new exposure operation starts. In one embodiment, the exposure values needed for the low frame rate and the high frame rate are the same. In such case, the exposure operation of a next frame is not stopped. The analog circuits and digital circuits related with the image sensor can be switched to settings of the high frame rate and operate accordingly and immediately.

In one embodiment, the reset operation Re can be performed in a very short time nearly zero, or the reset operation Re can be ignored or removed due to the circuit design. In such case, the time point TP_St at which the frame rate switch is triggered and the time point TP_Sr at which the frame rate switch is performed are the same, as illustrated in FIG. 4.

Figure 5:
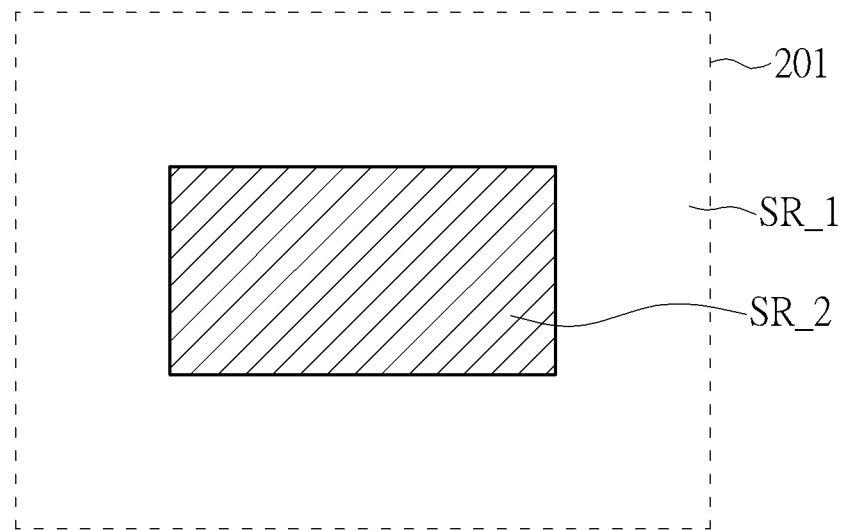
FIG. 5 and FIG. 6 are schematic diagrams illustrating examples for reducing frame data amount of each frame when the image sensor is applying a high frame rate.
Figure 6:
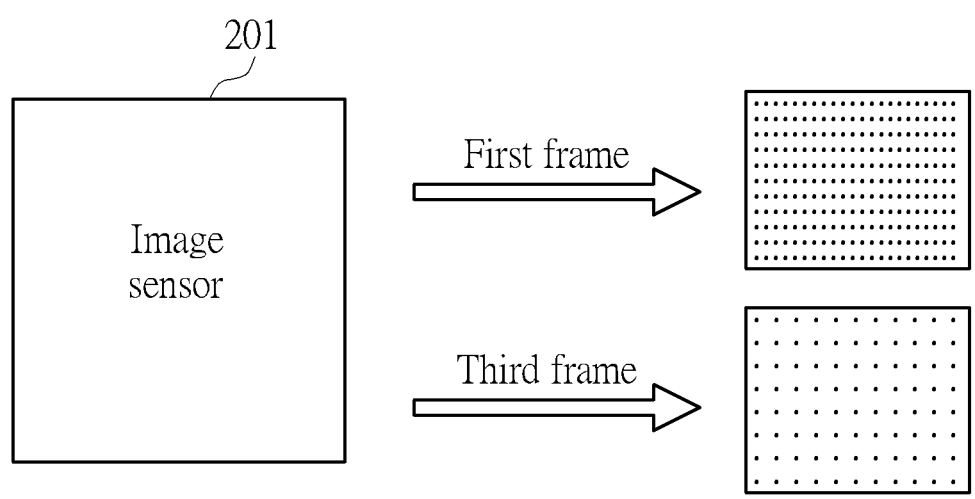

Due to hardware constraints or other laminations, the speed for processing the frame data is limited. Therefore, embodiments for reducing frame data amount of each frame sensed at a high frame rate are also provided in FIG. 5 and FIG. 6.

In one embodiment, the sensing array of the image sensor could be adjusted to decrease processing load in high frame rate operation. Please refer to FIG. 5, the control circuit 203 controls the image sensor 201 to apply a first sensing region SR_1 to sense the first frame at a low frame rate and to apply a second sensing region SR_2 smaller than the first sensing region SR_1 at a high frame rate. Since the pixel density of the first sensing region SR_1 and the pixel density of the second sensing region SR_2 are the same, the image sensor 201 can generate fewer frame data of each frame while applying the high frame rate by such mechanism.

Additionally, in another embodiment down-sampling can be used to decrease processing load in high frame rate operation. Please refer to FIG. 6, the control circuit 203 controls the image sensor 201 to perform no down-sampling while sensing the first frame at a low frame rate and to perform down-sampling while sensing the third frame at a high frame rate. By this way, the frame data amount of each frame sensed by applying a high frame rate can be reduced as well.

Figure 7:
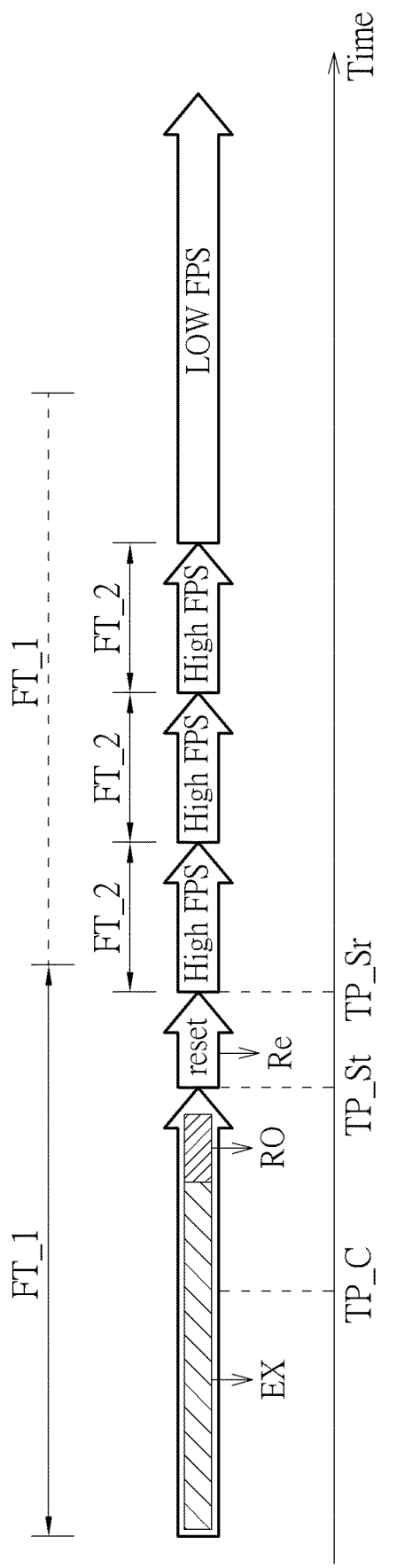
FIG. 7-FIG. 9 are schematic diagrams illustrating image sensing methods according to different embodiments of the present invention.

Please refer to FIG. 2 and FIG. 7. In one embodiment, the image sensor 201 senses the above-mentioned first frame to generate first sensing units SU (e.g. sensing charges), and the reading circuit 205 is configured to read the first sensing units SU. The image sensor 201 performs an exposure operation (e.g. the exposure operation EX in FIG. 7) to sense the first frame to accordingly generate first sensing units. After that, the reading circuit 205 can perform a read operation (e.g. the read operation RO in FIG. 7) reads the first sensing units SU from the image sensor 201, such that the control circuit 203 can determine whether exposure variation occurs in the first frame period according to the sensing units. Please note, such operations can be performed to any other frame rather than limited to the first frame.

The exposure operation means the image sensor receives light to generate a frame. The exposure time can be controlled, for example, the active or non-active of the image sensor, the on/off of a light source or a shutter/an aperture of a camera in which the image sensor is provided.

In the embodiment of FIG. 7 the first time is smaller than the frame period. In FIG. 7, the image sensor 201 is supposed to respectively sense a first frame and a second frame during a first frame period (the frame time FT_1 marked by solid lines) and a second frame period (the frame time FT_1 marked by dotted lines) if no frame variation occurs in the first frame period and the second frame period. Additionally, the exposure variation in this embodiment occurs at the time point TP_C, which is in a time that the exposure operation EX is performed. Also, the frame rate switch is triggered at the time point TP_St, after the reading operation RO. After that, the frame rate switch is performed at the time point TP_Sr in the first period, after the reset operation Re.

As above-mentioned, if no reset operation Re is performed or the time of the reset operation Re is very short and could be ignored, the time point TP_St and the time point TP_Sr can be the same. Please note, in the embodiment of FIG. 7, the exposure time of the exposure operation EX is smaller than the first frame period and the reading operation RO is also performed in the first frame period. Therefore, the embodiment illustrated in FIG. 7 can be illustrated as: the first frame is completely sensed before the first frame period ends (i.e. the exposure operation EX and the reading operation are performed), and the frame rate switch is performed in the first frame time period and after the first frame is completely sensed.

Figure 8:
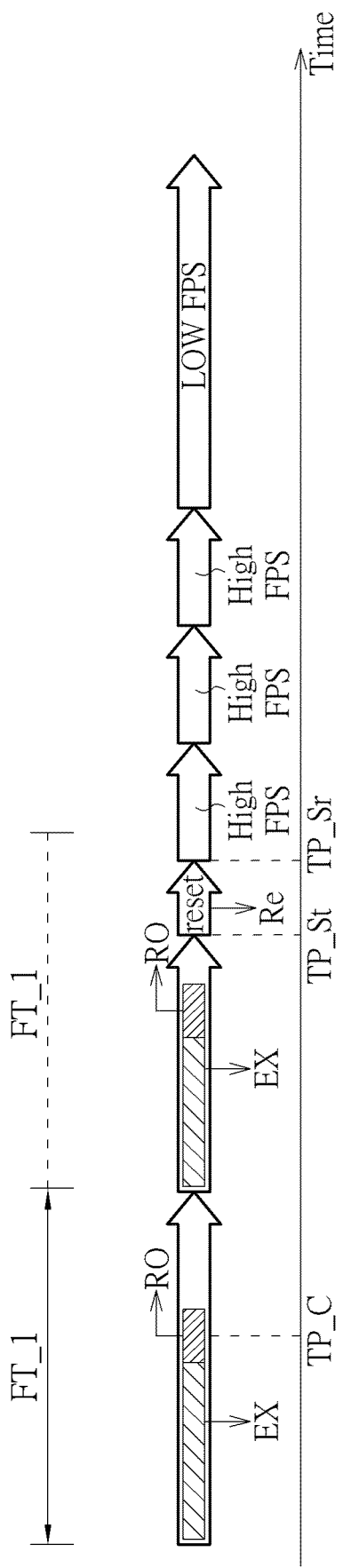

In the embodiment of FIG. 8, the frame time is smaller than the frame period. FIG. 8 is a schematic diagram illustrating an image sensing method according to another embodiment of the present invention. In such embodiment, the image sensor 201 is supposed to use the first frame time FT_1 to sense a first frame during a first frame period (solid lines) and to use the first frame time FT_1 to sense a second frame during a second frame period (dotted lines) if no exposure variation occurs in the first frame period and the second frame period.

In the embodiment of FIG. 8, the exposure variation occurs at a time point TP_C while a read operation RO for the first frame is performed in a first time period. Therefore, the control circuit 203 could not determine such exposure variation occurs until the second frame is sensed in a following second time period. Therefore, the frame rate is switched at the time point TP_Sr during or after the second frame period.

In the embodiment of FIG. 8, the frame rate is switched after the exposure operation EX and the read operation RO in the second frame period are completed. Accordingly, the frame rate switch is triggered at the time point TP_St and performed at the time point TP_Sr before the first frame time FT_1 of the second frame period lapsed. Briefly, in the embodiment of FIG. 8, the exposure variation occurs in the first frame period, and the frame rate switch is performed before the second frame period ends. As above-mentioned, if the time of the reset operation Re is very short or the reset operation Re is not needed, the time point TP_St and the time point TP_Sr are the same.

Figure 9:
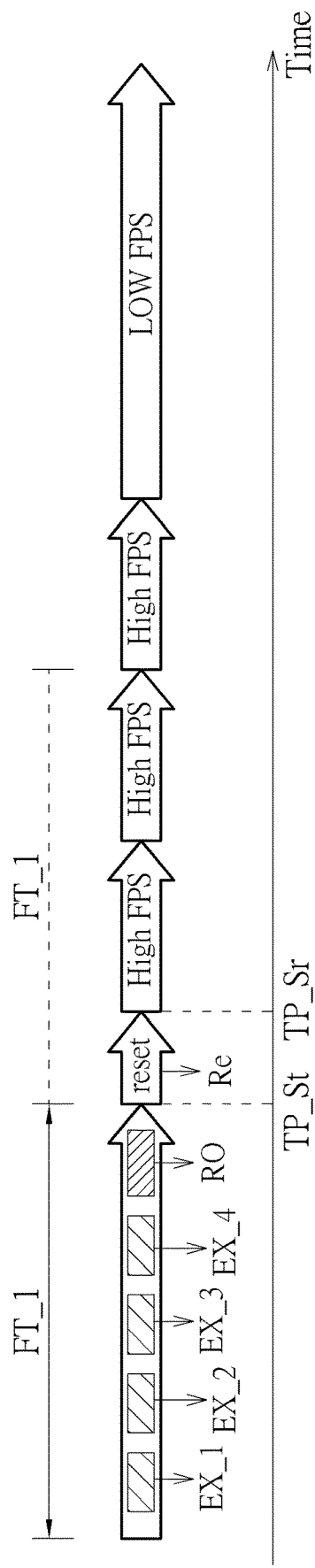

The frame time and the frame period in the embodiment of FIG. 9 are also the same. FIG. 9 is a schematic diagram illustrating an image sensing method according to another embodiment of the present invention. In this embodiment, the exposure operation in the first frame period is divided into the first exposure operation EX_1, the second exposure operation EX_2, the third exposure operation EX_3 and the fourth exposure operation EX_4, but the embodiment of FIG. 9 is not limited to have four non-continuous exposure operations. The read operation RO is performed after all exposure operations are completed.

In the embodiment of FIG. 9, the control circuit 203 can determine the exposure variation occurs as long as the exposure variation occurs before the read operation RO is performed. Accordingly, the frame rate switch can be performed in a second frame period following the first frame period, and the frame rate switch will not be delayed. The non-continuous operations extend the time in which the exposure variation can be determined. Therefore, the embodiment illustrated in FIG. 9 is also helpful to reduce the delay of a frame rate switch. Briefly, in the embodiment of FIG. 9, since a long exposure operation (e.g. the exposure operation EX in FIG. 8) is separated into a plurality of short exposure operations and distributed in a longer time period (e.g. the exposure operations EX_1-EX_4 in FIG. 9), the time period in which the exposure variation can be detected is extended. Therefore, it is less likely to miss the exposure variation in the embodiment of FIG. 9.

In view of above-mentioned embodiments, the frame rate switch delay can be reduced. Also, the frame data amount of each frame sensed at a high frame rate can also be reduced. However, it will be appreciated that the present invention is not limited to solve such problem.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image sensing method, comprising:
   (a) controlling an image sensor to apply a first frame rate to sense a first frame during a first frame period;
   (b) determining an exposure variation in the first frame period; and
   (c) during one of the first frame period and a second frame period following the first frame period, stopping applying the first frame rate and switching the image sensor to apply a second frame rate different from the first frame rate to sense at least one third frame, when the step (b) determines the exposure variation exceeds a threshold level.

2. The image sensing method of claim 1, further comprising:
   controlling the image sensor to apply the first frame rate to sense a second frame during the second frame period;
   wherein the step (c) is performed before the second frame is completely sensed.

3. The image sensing method of claim 1, wherein the second frame rate is higher than the first frame rate.

4. The image sensing method of claim 3, further comprising:

controlling the image sensor to apply a first sensing region to sense the first frame and to apply a second sensing region smaller than the first sensing region to sense the third frame.

5. The image sensing method of claim 3, further comprising:
controlling the image sensor to perform no down-sampling while sensing the first frame and to perform down-sampling while sensing the third frame.

6. The image sensing method of claim 1, wherein the first frame is completely sensed before the first frame period ends, wherein the step (c) is performed in the first frame period after the first frame is completely sensed.

7. The image sensing method of claim 6,
wherein the step (a) comprising: controlling the image sensor to sense the first frame to generate first sensing units;
wherein the image sensing method further comprises:
(d) performing an exposure operation for the first frame in an exposure time smaller than the first frame period; and
(e) reading the first sensing units from the image sensor in the first frame period, after the exposure operation is completed;
wherein the step (c) is performed following the step (e) and in the first frame time period.

8. The image sensing method of claim 6,
wherein the step (a) comprises: controlling the image sensor to sense the first frame to generate first sensing units;
wherein the image sensing method further comprises:
(d) performing an exposure operation for the first frame in an exposure time smaller than the first frame period; and
(e) reading the first sensing units from the image sensor in the first frame period, after the exposure operation is completed;
(f) controlling the image sensor to apply the first frame rate to sense a second frame during a second frame period following the first frame period;
wherein the step (c) is performed before the second frame period ends.

9. The image sensing method of claim 1,
wherein the step (a) comprising: controlling the image sensor to sense the first frame to generate first sensing units;
wherein the image sensing method further comprises:
performing a first exposure operation for the first frame during a first exposure time, and a second exposure operation during a second exposure time, wherein the first exposure operation and the second exposure operation are not continuous; and
reading the first sensing units from the image sensor in the first frame period, after the first exposure operation and the second exposure operation are completed.

10. The image sensing method of claim 1, wherein the second frame rate is lower than the first frame rate.

11. An image sensing system, comprising:
an image sensor; and
a control circuit, configured to perform steps of:
(a) controlling the image sensor to apply a first frame rate to sense a first frame during a first frame period;
(b) determining exposure variation in the first frame period; and
(c) during one of the first frame period and a second frame period following the first frame period, stopping applying the first frame rate and switching the image sensor to apply a second frame rate different from the first frame rate to sense at least one third frame, when the step (b) determines the exposure variation exceeds a threshold level.

12. The image sensing system of claim 11, wherein the control circuit is further configured to perform steps of:
controlling the image sensor to apply the first frame rate to sense a second frame during a second frame period following the first frame period;
wherein the step (c) is performed before the second frame is completely sensed.

13. The image sensing system of claim 11, wherein the second frame rate is higher than the first frame rate.

14. The image sensing system of claim 13, wherein the control circuit is further configured to perform a step of:
controlling the image sensor to apply a first sensing region to sense the first frame and to apply a second sensing region smaller than the first sensing region to sense the third frame.

15. The image sensing system of claim 13, wherein the control circuit is further configured to perform a step of:
controlling the image sensor to perform no down-sampling while sensing the first frame and to perform down-sampling while sensing the third frame.

16. The image sensing system of claim 11, wherein the first frame is completely sensed before the first frame period ends, wherein the step (c) is performed in the first frame period after the first frame is completely sensed.

17. The image sensing system of claim 16, further comprising a reading circuit;
wherein the step (a) comprising:
controlling the image sensor to sense the first frame to generate first sensing units;
wherein the control circuit is further configured to perform steps of:
(d) controlling the image sensor to perform an exposure operation for the first frame in an exposure time smaller than the first frame period; and
(e) controlling the reading circuit to read the first sensing units from the image sensor in the first frame period, after the exposure operation is completed;
wherein the step (c) is performed following the step (e) and in the first frame time period.

18. The image sensing system of claim 16, further comprising a reading circuit;
wherein the step (a) comprising:
controlling the image sensor to sense the first frame to generate first sensing units;
wherein the control circuit is further configured to perform steps of:
(d) controlling the image sensor to an exposure operation for the first frame in an exposure time smaller than the first frame period; and
(e) controlling the reading circuit to read the first sensing units from the image sensor in the first frame period, after the exposure operation is completed;
(f) controlling the image sensor to apply the first frame rate to sense a second frame during a second frame period following the first frame period;
wherein the step (c) is performed before the second frame period ends.

19. The image sensing system of claim 11,
wherein the step (a) comprises: controlling the image sensor to sense the first frame to generate first sensing units;
wherein the control circuit is further configured to perform steps of:

controlling the image sensor to perform a first exposure operation for the first frame during a first exposure time, and a second exposure operation during a second exposure time, wherein the first exposure operation and the second exposure operation are not continuous; and controlling the reading circuit to read the first sensing units from the image sensor in the first frame period, after the first exposure operation and the second exposure operation are completed.

20. The image sensing system of claim 11, wherein the second frame rate is lower than the first frame rate.

\* \* \* \* \*